United States Patent [19]

Lory et al.

[11] Patent Number: 5,768,622

[45] Date of Patent: Jun. 16, 1998

[54] SYSTEM FOR PREEMPTIVE BUS MASTER TERMINATION BY DETERMINING TERMINATION DATA FOR EACH TARGET DEVICE AND PERIODICALLY TERMINATING BURST TRANSFER TO DEVICE ACCORDING TO TERMINATION DATA

[75] Inventors: Jay R. Lory; Victor K. Pecone, both of Austin, Tex.

[73] Assignee: Dell U.S.A., L.P., Austin, Tex.

[21] Appl. No.: 516,837

[22] Filed: Aug. 18, 1995

[51] Int. Cl.[6] ........................................... G06F 13/28
[52] U.S. Cl. ............................... 395/855; 395/852
[58] Field of Search ........................... 375/7; 395/200, 395/473, 800, 855, 852

[56] References Cited

U.S. PATENT DOCUMENTS

| 4,995,056 | 2/1991 | Frogg Jr. et al. | 375/7 |
| 5,377,325 | 12/1994 | Chan | 395/200 |
| 5,584,033 | 12/1996 | Barrett et al. | 395/800 |
| 5,623,633 | 4/1997 | Zeller et al. | 395/473 |

*Primary Examiner*—Thomas C. Lee
*Assistant Examiner*—David Ton
*Attorney, Agent, or Firm*—Haynes and Boone, L.L.P.

[57] ABSTRACT

A PCI bus master which determines the termination characteristics of one or more PCI targets coupled to the bus and uses this information to eliminate the wait states that are incurred during a bus cycle when a target device attempts to perform a data phase termination. According to the present invention, at initialization the bus master performs burst cycles on arbitrary address boundaries and stores the target's termination boundaries and cycle conditions. The bus master uses this information during burst transfers to initiate the data phase termination prior to the target, thus preempting the target from performing this termination. This operates to maintain the target's maximum burst capabilities while also eliminating the rearbitration wait states incurred when the bus master receives a termination from the target device. This also allows the bus master to chain together fast back-to-back PCI cycles while retaining bus ownership.

20 Claims, 7 Drawing Sheets

SYSTEM FOR PREEMPTIVE BUS MASTER TERMINATION BY DETERMINING TERMINATION DATA FOR EACH TARGET DEVICE AND PERIODICALLY TERMINATING BURST TRANSFER TO DEVICE ACCORDING TO TERMINATION DATA

FIELD OF THE INVENTION

The present invention relates to bus transfers in computer systems, and more particularly to a bus master which predicts and preempts a target's termination cycle during burst transfers for improved performance.

DESCRIPTION OF THE RELATED ART

Computer architectures generally include a plurality of devices interconnected by one or more various buses. For example, modern computer systems typically include a CPU coupled through cache bridge logic to main memory. The cache bridge logic also typically couples to a high bandwidth local expansion bus, such as the peripheral component interconnect (PCI) bus or the VESA (Video Electronics Standards Association) VL bus. Examples of devices which can be coupled to local expansion buses include SCSI adapters, network interface cards, video adapters, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices are typically coupled to this second expansion bus, including a fax/modem, sound card, etc.

In a high performance PCI device, the PCI controller or PCI bus interface is required to act as a bus master to perform transfers on the bus. Common examples of PCI devices which behave as bus masters include disk array controllers and network interface controllers. PCI devices which behave as bus masters generally include a direct memory access (DMA) engine. The DMA engine provides a hardware mechanism for transferring large sequential groups of data between a controller's local memory and a host's system memory.

High performance bus architectures such as the PCI bus architecture define burst cycles which optimize the data transfer performance of long sequential strings of data. In many bus architectures, the maximum burst length is typically not defined. In these systems the master and/or target device involved in the burst transfer has the responsibility to terminate the data phase of the cycle. In general, the optimal condition is for the initiator of the cycle, i.e., the bus master, to terminate the burst transfer. However, it is common for a memory target device to terminate the burst transfer. For example, many PCI devices and PCI chip sets terminate burst transfers when responding as PCI targets. One example of where a PCI target device terminates a burst transfer includes where the PCI device has a fixed size posting/ prefetching data buffer and thus is required to terminate the burst transfer when the data buffer becomes full. Another example is where a PCI target memory interface includes a cache which is required to be snooped and thus inherently requires resynchronization at cache line boundaries.

When a target device terminates a bus cycle, the PCI data transfer cycle can suffer up to two wait states where no data is transferred. In addition, many bus architectures, such as the PCI architecture, require the bus master to rearbitrate for bus ownership after the target has terminated the transfer. This rearbitration requires a minimum of two additional wait states in a best case bus parking scenario. As a result, PCI target termination during burst cycles considerably lowers peak throughput performance of the bus. Therefore an improved system and method is desired which provides increased performance during bus master cycles where target termination is possible.

SUMMARY OF THE INVENTION

The present invention comprises a bus master which intelligently predicts the termination characteristics of one or more PCI targets coupled to the bus and uses this information during burst cycles to eliminate the wait states that are incurred during a bus cycle when a target device attempts to perform a data phase termination. According to the present invention, the bus master uses this information to initiate the data phase termination prior to the target. This operates to maintain the target's maximum burst capabilities while also eliminating the rearbitration wait states incurred when the bus master receives a termination from the target device. This also allows the bus master to chain together fast back-to-back PCI cycles while retaining bus ownership.

According to the present invention, at initialization the bus master performs a plurality of data transfers of different lengths to one or more targets on the bus to determine each target's termination characteristics. Thus, the bus master performs burst cycles on arbitrary address boundaries and stores the target's termination boundaries and cycle conditions. This is preferably performed during an option ROM initiation routine or during device driver initiation. In an alternate embodiment, a user manually programs the bus master with information regarding the target's termination characteristics through a device configuration utility or device driver. Where multiple targets are situated on the bus which perform terminations, the bus master maintains the address region of each respective target, and termination decisions are made from a hardware lookup table which contains the configuration and termination data relative to each target.

The bus master uses the target termination information to calibrate its burst state machines accordingly. According to the present invention, the number of cycles prior to a target's termination is stored in a counter associated with the target. At the beginning of a burst transfer, the counter begins counting (or is initialized with the start address boundary). When the counter counts down to zero (or reaches a predetermined address), indicating that the respective number of cycles have been performed, the bus master terminates the cycle, thus preempting the target from performing this termination. The bus master preferably periodically terminates cycles during the burst transfer to preempt the target from terminating the cycles. Since the bus master initiates the data phase termination before the target, the target's maximum burst capabilities are maintained. This eliminates the wait states incurred by a target data phase termination and also eliminates rearbitration for the bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*PCI System Architecture* by Tom Shanley and Don Anderson and available from Mindshare Press, 2202 Buttercup Dr., Richardson, Tex. 75082 (214) 231-2216, is hereby incorporated by reference in its entirety.

Computer System Block Diagram

Figure 1:
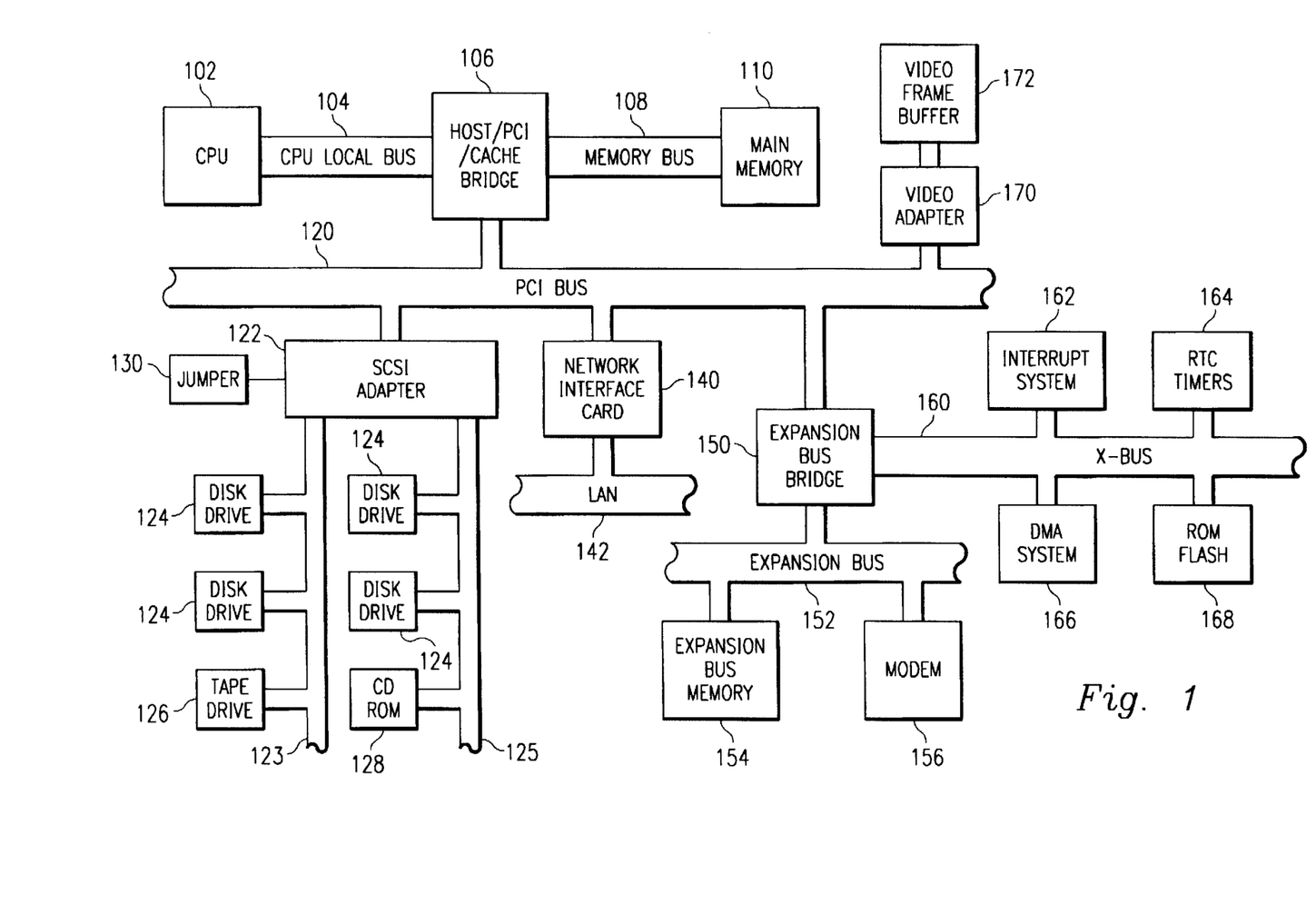
FIG. 1 is a block diagram of a computer system including the present invention.

Referring now to FIG. 1, a block diagram of a computer system incorporating one or more bus devices and including a bus master which predicts target termination cycles and preempts these cycles for improved performance according to the present invention is shown. In the preferred embodiment of the invention, the bus master is a PCI bus master adapted for coupling to a PCI bus. However, it is noted that the present invention may be incorporated into any of various types of systems including various types of buses, as desired.

As shown, the computer system includes a central processing unit (CPU) 102 which is coupled through a CPU local bus 104 to a host/PCI/cache bridge or chipset 106. The bridge or chipset 106 is preferably the Triton chipset available from Intel Corporation. For more information on the Triton chipset, please see data sheets on the Intel 82430FX PCIset chipset, also referred to as the Triton chipset, which are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Various types of devices may be connected to the PCI bus 120, including one or more bus masters and one or more target devices. In the embodiment shown in FIG. 1, a video adapter 170 and video frame buffer 172 are coupled to the PCI bus 120 for controlling video functions. A SCSI (small computer systems interface) adapter 122 is coupled to the PCI bus 120. In the preferred embodiment, the SCSI adapter 122 is a SCSI disk controller which includes two SCSI channels 123 and 125. Each of the SCSI channels 123 and 125 include eight disk drive units 124 forming a disk array. The SCSI adapter 122 includes logic according to the present invention which determines target termination characteristics and preempts target termination cycles for improved performance. Various other devices may be connected to the PCI bus 120, such as a network interface card 140. As shown, the network interface card 140 interfaces to a local area network (LAN) 142.

The various devices coupled to the PCI bus 120, including the bridge logic 106, SCSI adapter 122, video adapter 170, and network adapter 140, are configured as bus masters and/or targets. One or more of the target devices terminate burst transfers when responding as PCI targets. In one embodiment, one or more of the targets has a fixed size posting/prefetching data buffer. In addition, one or more of the targets includes a cache which is required to be snooped and thus inherently requires resynchronization at cache line boundaries.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) SRAM 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

According to the present invention, at initialization one or more of the PCI bus masters determine the termination characteristics of each of one or more targets coupled to the bus. In the preferred embodiment, each bus master includes a DMA engine, and the bus master configures the DMA engine at initialization to perform a plurality of transfers at different boundaries to detect the termination cycles, i.e., to detect the number of bus cycles which occur before the target terminates the transfer. Once the bus master has detected the number of termination cycles, this information is stored, preferably in a memory or in a counter. On subsequent transfers to this target, the counter is loaded and counts down to determine when the bus master should terminate the transfer. Thus the bus master intelligently determines configuration data from the respective targets and uses this information to terminate the transfer at the appropriate time, i.e., to preempt the target's termination. This results in greatly increased performance.

Disk Controller Block Diagram

Figure 2:
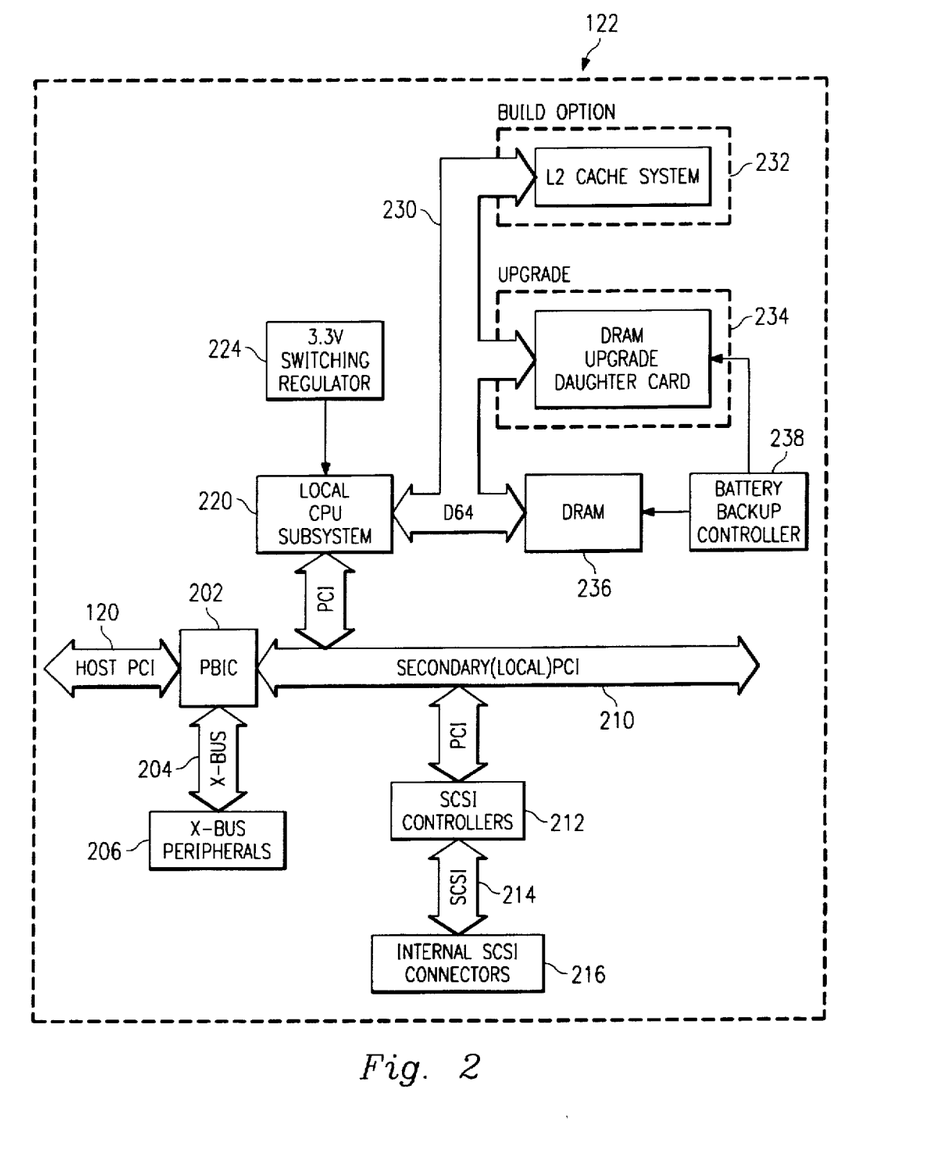
FIG. 2 illustrates a block diagram of the disk controller in the diagram of FIG. 1.

In the preferred embodiment, the present invention is comprised in the disk controller 122. However, it is noted that the present invention may be incorporated into any of various types of PCI bus masters. Referring now to FIG. 2, a block diagram illustrating the SCSI adapter or disk controller 122 in FIG. 1 is shown. As shown, the SCSI adapter 122 includes a PCI bus interface chip (PBIC) 202, which couples to the host or primary PCI bus 120. The PBIC 202 includes target termination prediction logic and termination logic according to the present invention. The PBIC 202 interfaces through a second X-bus 204 to various X-bus peripherals 206 as shown. The various X-bus peripherals 206 may include a DMA SRAM, interrupt system, timers, a real time clock (RTC), configuration ports, diagnostic ports, command/status registers, ROM/Flash memory, and non-volatile SRAM (NVSRAM) (all not shown).

The PBIC 202 also couples to a secondary PCI bus 210. SCSI controllers 212 are coupled to the secondary PCI bus 210. The SCSI controllers 212 in turn couple through a SCSI bus 214 to internal SCSI connectors 216. In the preferred embodiment, two SCSI controllers are incorporated into block 212, and the SCSI bus 214 comprises the two SCSI channels 123 and 125. The internal SCSI connectors 216 are for attaching the various devices, such as the disk drives 124, as shown in FIG. 1.

A local CPU 220 is coupled to the secondary PCI bus 210. The local CPU 220 may be any of various types. In the preferred embodiment, the local CPU 220 is the PowerPC microprocessor produced by Motorola and IBM. In an alternate embodiment, the local CPU 220 is the Alpha chip from Digital Equipment Corporation (DEC). The local CPU 220 receives power from a 3.3V switching regulator 224, as shown. The local CPU 220 includes a 64 bit data path which couples through a 64-bit data bus 230. Dynamic random access memory (DRAM) 236 is coupled to the 64-bit data bus 230. The DRAM 236 stores a plurality of layers of drivers executed by the local CPU 220 to service host requests.

The 64-bit data bus 230 also includes a connection for coupling to an optional dynamic random access memory (DRAM) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

PBIC Block Diagram

Figure 3:
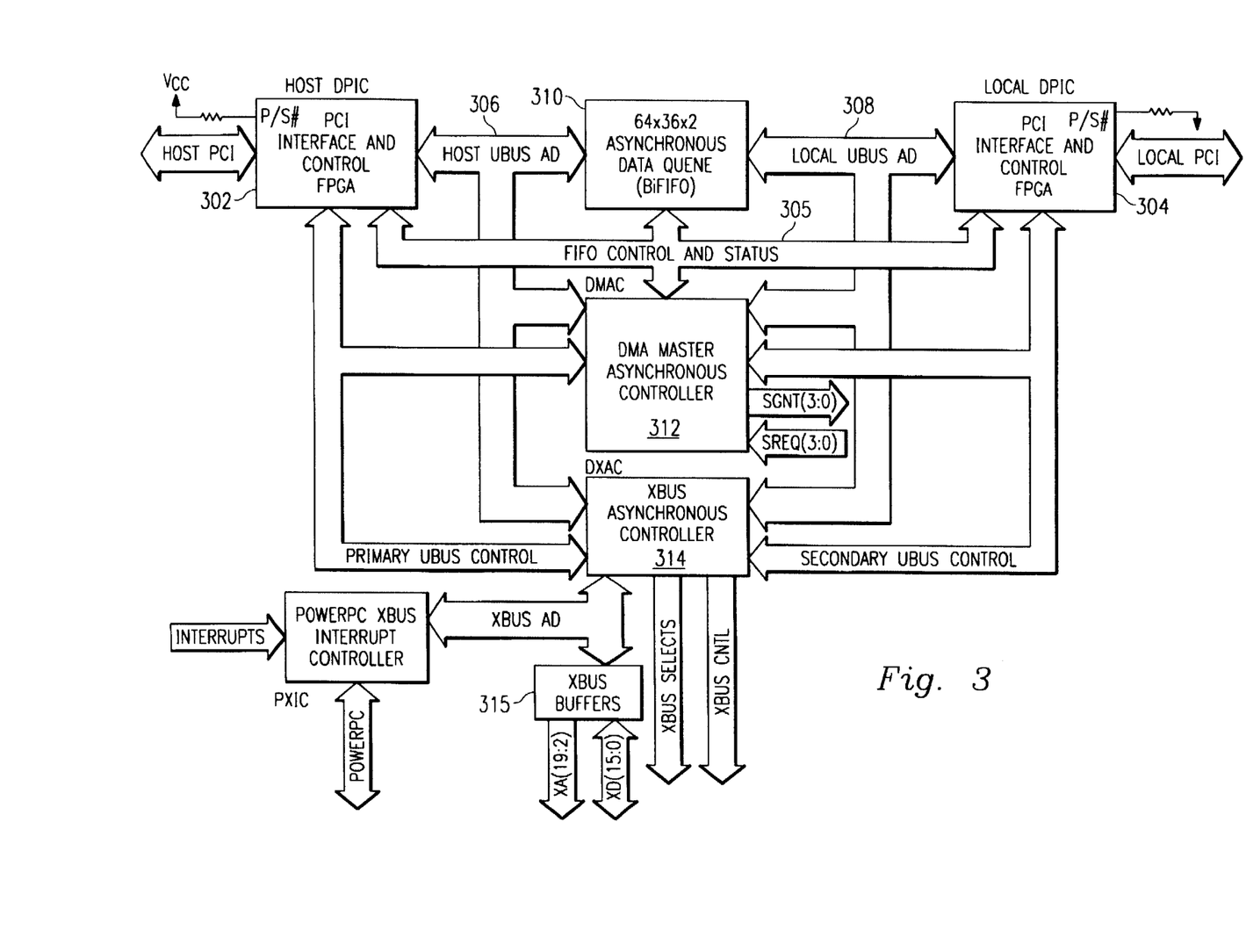
FIG. 3 illustrates the PBIC logic in the disk controller of FIG. 2.

Referring now to FIG. 3, a block diagram illustrating the design of the PCI bus interface controller (PBIC) 202 according to the present invention is shown. As shown, the PBIC 202 includes a primary PCI interface 302, referred to as a host DPIC (dual PCI interface controller) and a secondary PCI interface 304, referred to as a local DPIC (dual PCI interface controller). As shown, the primary PCI interface 302 interfaces to the host or primary PCI bus 120. The secondary PCI interface 304 interfaces to the secondary or local PCI bus 210. The primary PCI interface 302 and secondary PCI interface 304 interface to each other via a control and status bus 305 as shown. The primary PCI interface 302 also provides various bus signals over bus 306, including address and data signals. Likewise, the secondary PCI interface 304 provides bus signals, including address and data signals, over bus 308.

Data Queue 310 is coupled between bus 306 and bus 308 to allow data communication between the primary PCI interface 302 and the secondary PCI interface 304. A DMA (direct memory access) Master Asynchronous Controller (DMAC) 312 is coupled between each of the buses 306 and 308, and the primary PCI interface 302 and secondary PCI interface 304 provide their respective bus signals to the DMAC 312 as shown. The DMAC 312 includes target prediction logic and target termination logic according to the present invention, as discussed further below. The primary PCI interface 302 and secondary PCI interface 304 also each provide their respective bus signals over buses 306 and 308 to an X-bus Asynchronous Controller (DXAC) 314. The DXAC 314 interfaces through Xbus buffers 315 to the peripheral bus or X-bus 204. As mentioned above, various peripheral devices (not shown) are connected to the peripheral bus 204, including an interrupt subsystem, a real time clock, various timers, ROM/Flash memory, non-volatile SRAM, communication ports, diagnostic ports, command/status registers, etc.

The PBIC 202 comprises a high performance host PCI to local PCI bus controller interface. The PBIC architecture includes a symmetrical design for sharing DMA controller and peripheral extension bus (X-bus) resources between each PCI side. The primary PCI interface 302 and secondary PCI interface 304 provide master/slave interfaces between each PCI side. The PCI interfaces 302 and 304 symmetrically interface to the data queue 310 and the DMAC 312 for DMA and/or burst cycles.

Target Termination Logic

Figure 4:
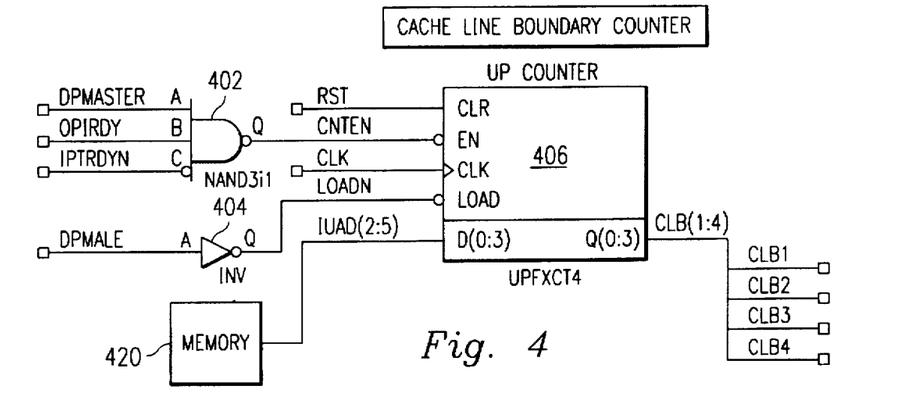
FIG. 4 illustrates cache line boundary counter logic in the disk controller of FIG. 2.
Figure 5:
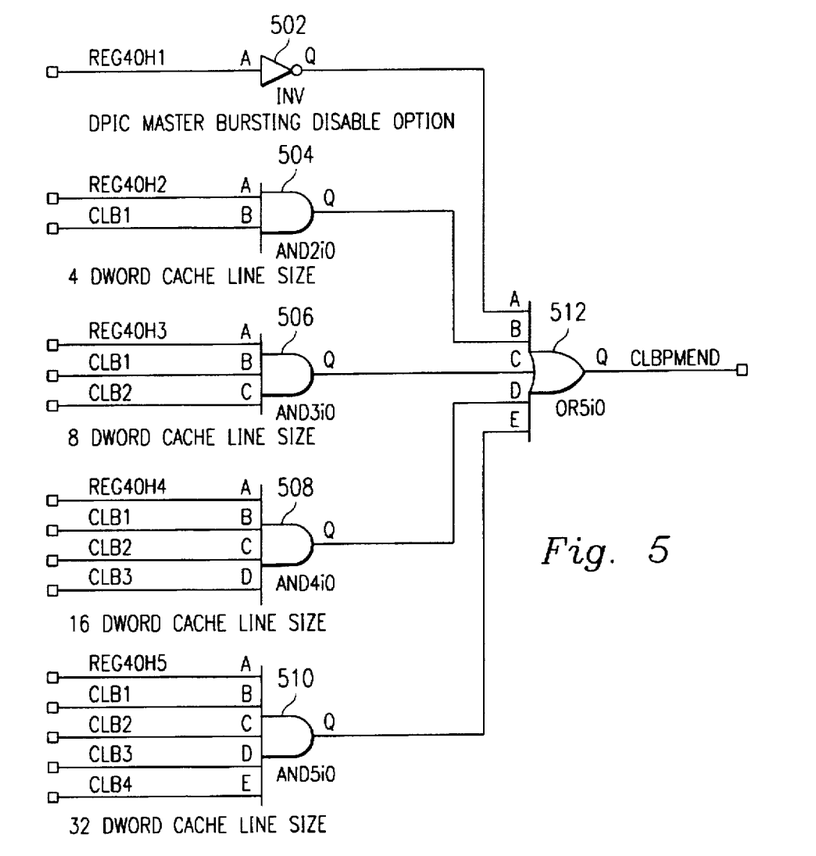
FIG. 5 illustrates master termination bit generation logic in the disk controller of FIG. 2.
Figure 6:
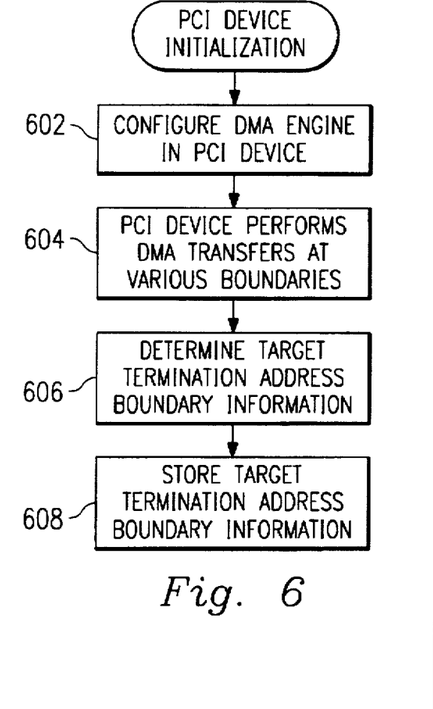
FIG. 6 is a flowchart diagram illustrating operation of a PCI bus master obtaining target termination data according to the present invention.
Figure 7:
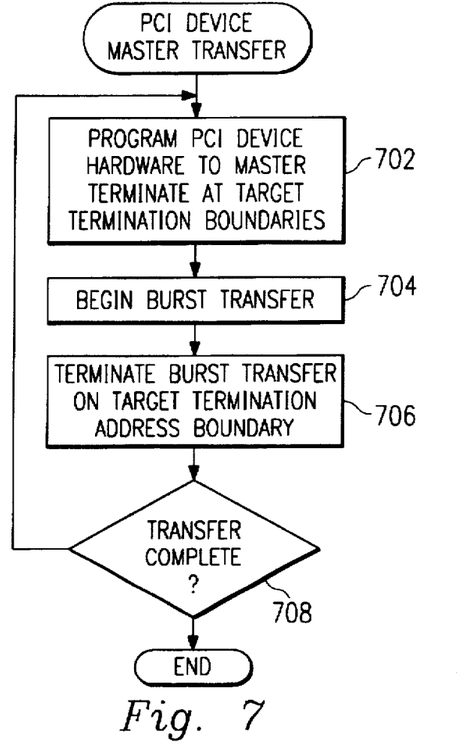
FIG. 7 is a flowchart diagram illustrating operation of a PCI bus master using target termination data to preempt target termination cycles during burst transfers according to the present invention.

FIGS. 4–5 illustrate logic in the DMAC 312 which performs preemptive target termination according to the present invention. A flowchart diagram illustrating operation of the logic of FIGS. 4 and 5 is shown in FIG. 7. Also, a flowchart diagram illusrating opertion of the DMAC 312 in determining termination data of a target device is shown in FIG. 6.

Referring now to FIG. 4, a cache line boundary counter 406 according to the present invention which counts valid data cycles duping burst transfers according to the present invention is shown. The cache line boundary counter 406 is preferably comprised in the DMAC 312 shown in FIG. 2. In the preferred embodiment, the cache line boundary counter 406 counts a number of transfer cycles corresponding to a target device's cache line boundaries. In another embodiment, the counter 406 counts a number of transfer cycles corresponding to the size of a transfer device's posting/prefetching buffer.

As shown, the cache line boundary counter 406 includes a clear (CLR) input which receives a reset signal referred to as RST and a clock input which receives a clocking signal referred to as CLK. Signals referred to as DPMASTER and OPIRDY are provided to two inputs of a three input NAND gate 402. A signal referred to as IPTRDYN is connected to an inverted input of the NAND gate 402. The DPMASTER signal indicates that the respective bus master device, in the preferred embodiment the SCSI controller 122, is acting as a master on the PCI bus. The OPIRDY and the IPTRDYN signals indicate that the data cycle is valid. The output of the NAND gate 402 is a counter enable signal referred to as CNTEN, which is provided to an inverted enable input of the counter 406.

An address latch enable signal referred to as DPMALE is connected through an inverter 404 and generates a signal referred to as LOADN. The LOADN signal is provided to an inverted load input of the counter 406. The DPMALE signal is an address latch enable signal for the bus master. The counter includes four data inputs referred to as D[0:3] which receives address lines IUAD [2:5]. The IUAD [2:5] signal lines are preferably provided from a memory 420 which stores address boundary information for respective targets. In one embodiment, the IUAD [2:5] signal lines are stored directly in register associated with each counter 406.

Thus, on the beginning of a first transfer, the address lines IUAD [2:5] are provided to the data input of the counter 406 and the LOADN signal is asserted to load this data into the counter 406. When the first cycle begins, indicated by the CNTEN signal being asserted low, then the counter 406 is enabled and begins counting down. The counter 406 includes four outputs referred to as CLB[1:4] which are cache line boundary signals. The counter preferrably counts down from the loaded address bits, and the counting down is indicated by the cache line boundary signals CLB1–CLB4.

Referring now to FIG. 5, master termination logic which generates a termination signal according to the preferred embodiment of the invention is shown. This logic receives various signals from an 8-bit configuration register. These bits are referred to as REG40H(0)–RBG40H(7). The meaning of the bits in the configuration register which are used for the present invention are described below.

REG40H(1)=master continuous burst enable
REG40H(2)=master burst 4 DWORD boundary terminate enable
REG40H(3)=master burst 8 DWORD boundary terminate enable
REG40H(4)=master burst 16 DWORD boundary terminate enable
REG40H(5)=master burst 32 DWORD boundary terminate enable The master termination logic shown in FIG. 5 comprises logic elements 502–510 which generate five signals provided to a 5 input OR gate 502. The output of the OR gate 502 is a cache line boundary PCI master end signal (CLBPMEND) which indicates that a burst cycle should be terminated by the bus master.

As shown in FIG. 5, the REG40H1 signal is provided through an inverter 502 to an input of a 5 input OR gate 512. As noted above, the REG40H1 signal is negated to disable bursting operations.

The REG40H2 signal and the CLB1 signal are provided as inputs to a 2 input AND gate 504, whose output is provided to the OR gate 512. The AND gate 504 operates to terminate the burst transfers on 4 DWORD cache line boundaries.

The REG40H3 signal, the CLB1 signal and the CLB2 signal are provided as inputs to a three input AND gate 506, whose output is provided to the OR gate 512. The AND gate 506 operates to terminate cycles on 8 DWORD cache line boundaries.

The REG40H4 signal and the CLB1, CLB2, and CLB3 signals are provided as inputs to a four input AND gate 508 whose output is provided to the OR gate 512. The AND gate 508 operates to terminate burst transfers on 16 DWORD cache line boundaries.

The REG40H5, the CLB1, the CLB2, the CLB3, and the CLB4 signals are provided as inputs to a five input AND gate 510 whose output is provided to the OR gate 512. The AND gate 510 operates to terminate burst cycles on 32 DWORD cache line boundaries.

As noted above, the output of the OR gate 512 is the CLBPMEND signal. The CLBPMEND signal is provided to DMA transfer state machine logic (not shown) in the DMAC 312, and the CLBPMEND signal operates to terminate bus master burst transfer cycles at the indicated cache line boundary as determined by the counter 406. Thus the bus master uses the target termination information to calibrate its burst state machines accordingly.

Flowchart Diagrams

FIGS. 6 and 7 are flowchart diagrams which illustrate operation of the PCI bus master according to the present invention. FIG. 6 illustrates PCI bus master operation during device initialization, and FIG. 7 illustrates operation of the PCI bus master during master burst transfers.

Referring now to FIG. 6, in step 602 the PCI device configures the DMA engine 312. In step 604 the PCI device performs one or more DMA transfers to a target device at various address boundaries. In step 606 the PCI device determines target termination information based on target terminations that occurred during the one or more transfers. As noted above, the PCI target device terminates transfers based on either its cache line boundary or the fixed size of its posting/prefetching buffer. In step 608 the PCI device stores the target termination information in the memory 420.

In the preferred embodiment, the target termination information comprises a cache line boundary address where the target terminates a burst transfer. The cache line boundary address inherently includes information regarding a number of cycles which are performed in the burst transfer before the bus master terminates the transfer. In an alternate embodiment, the target termination information comprises a number of cycles corresponding to the size of the target device's posting/prefetching buffer.

Thus, according to the present invention, at initialization the bus master performs a plurality of data transfers of different lengths to one or more targets on the bus to determine each target's termination characteristics. Thus, the bus master performs burst cycles on arbitrary address boundaries and stores the target's termination boundaries and cycle conditions. This is preferably performed during an option ROM initiation routine or during device driver initiation.

It is noted that other methods may be used to determine the target termination information. In an alternate embodiment, a user manually programs the bus master with information regarding each target's termination characteristics through a device configuration utility or device driver.

Where multiple targets are situated on the bus which perform terminations, the bus master preferably obtains target termination information for each target. In other words, the flowchart of FIG. 6 is executed for each target. In this embodiment, the bus master maintains a lookup table in the memory 420 which contains the configuration and termination data relative to each target, and termination decisions are made from the hardware lookup table.

Referring now to FIG. 7, operation of the PCI device during a bus master burst transfer is shown. In step 702 the PCI bus master device configures itself to terminate at the indicated target termination address boundary. In other words, the bus master retrieves the target termination information from the memory 420 regarding the termination characteristics of the target involved in the transfer and loads the counter 406 with the respective address bits from the memory 420. In step 704 the PCI device begins the burst transfer. The counter 406 also begins counting in step 704. In step 706, when the counter 406 has counted down the appropriate number of cycles, the bus master terminates the burst transfer on the target termination address boundary. If the operation has not completed in step 710 then the bus master returns to step 702, reloads the counter 406, and continues performing the burst transfer. The bus master performs steps 702–708 until the burst transfer has completed.

Timing Diagrams

Figure 8:
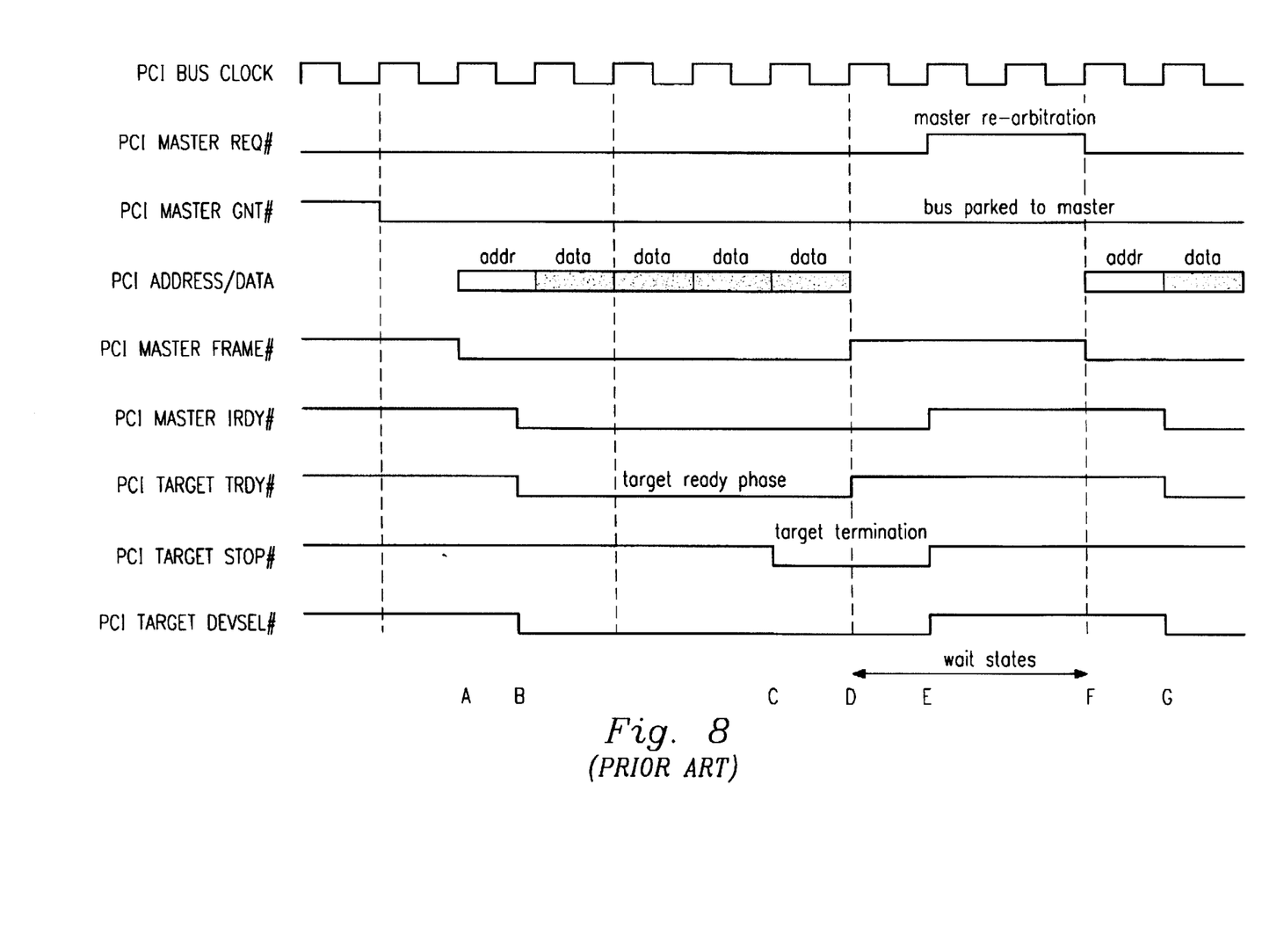
FIG. 8 is a timing diagram of a PCI bus data transfer according to the prior art.

Referring now to FIG. 8, a timing diagram illustrating a burst data transfer according to the prior art is shown. This timing diagram illustrates the typical cycle wait states and latency incurred during a burst cycle where the target initiates termination of the burst cycle according to the prior art. As shown in FIG. 8, the bus master begins the address portion of the transfer at time A by placing the address onto the PCI bus. The data phase begins at time B, where valid data is placed on the bus. As shown, the target terminates the cycle after the fourth data phase at point C, and wait states are imposed beginning at time D. The master is then required to rearbitrate for the bus at time E. Once this rearbitration has completed, a new address phase begins at time F, and a new data phase begins at time G. As shown in this example, three wait states and an address phase are incurred for every four clocks of data transfer. This results in a reduction in the peak bandwidth performance by fifty percent due to these additional wait states and address phase.

Figure 9:
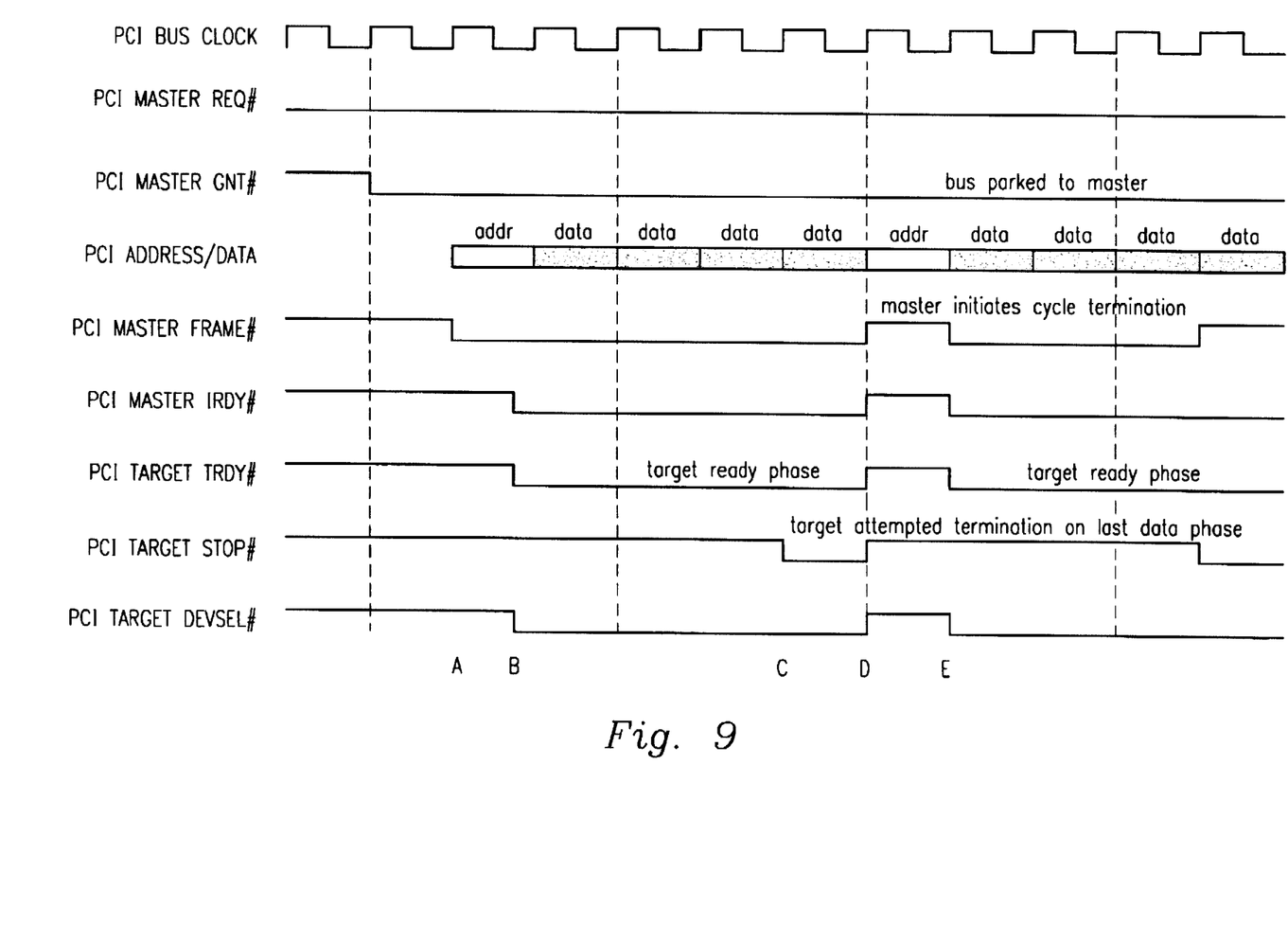
FIG. 9 is a timing diagram of a PCI bus data transfer according to the present invention.

Referring now to FIG. 9, a timing diagram illustrating a burst data transfer according to the present invention is shown. This timing diagram illustrates a similar type of data transfer as that shown in FIG. 8, except that the master initiates cycle termination according to the present invention. Thus, this timing diagram illustrates the present invention whereby the bus master initiates the cycle termination by predicting the target's pending termination based on address boundary and cycle type information that has been previously determined as described above.

As shown, at time A the bus master begins the address portion of the transfer at time A by placing the address onto the PCI bus. The data phase begins at time B, where valid data is place on the bus. As shown, the target attempts to terminate the cycle after the fourth data phase at point C. However, according to the present invention, the bus master terminates the cycle at time C, thus preempting the target's attempted termination. Thus no wait states are imposed, and the master is not required to rearbitrate for the bus. At time D the data phase completes, and at time E a new data phase begins. As shown, no additional wait states are required, and the only latency incurred between successive data phases of the burst transfer is the address phase of the successive back-to-back burst cycles. Thus, according to the present invention, the peak data transfer bandwidth is only reduced by 12.5 percent as compared to fifty percent according to the prior art.

Conclusion

Therefore, a system and method for performing burst transfers with increased performance is shown and described. According to the invention, the bus master determines the termination characteristics of a target and preempts the target's attempted termination during burst transfers. This eliminates wait states and rearbitration during the transfer and thus improves performance.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A bus master adapted for coupling to a bus that performs burst transfers to a target device on the bus, wherein the target device attempts to terminate cycles on the bus during burst transfers, and wherein the bus master predicts termination characteristics of the target device and preempts target termination cycles for improved performance, the bus master comprising:

a bus interface adapted for coupling to the bus;

memory for storing termination data for at least one target device coupled to the bus, wherein said termination data for the at least one target device includes a number indicative of how many cycles may be performed before the at least one target device attempts to terminate a burst transfer;

a direct memory access engine for performing burst transfers to the at least one target device on the bus, wherein the direct memory access engine is coupled to the memory and accesses said termination data from said memory for burst transfers to the at least one target device;

wherein during a burst transfer to the at least one target device the direct memory access engine periodically terminates the burst transfer after said number of cycles, wherein the periodic termination of the burst transfer by said direct memory access engine prevents said at least one target device from terminating the burst transfer, and wherein said direct memory access engine performs a plurality of transfers at initialization to each said at least one target device, wherein said plurality of transfers have different lengths, and wherein said plurality of transfers performed at initialization determine said termination data of each said at least one target device.

2. The bus master of claim 1, wherein said bus master further includes:

a counter coupled to said memory for storing said number of cycles;

wherein said counter begins counting during said burst transfer to the at least one target device; and wherein the direct memory access engine terminates the burst transfer when said counter counts said number of cycles.

3. The bus master of claim 2, wherein said bus master further includes:

means for periodically reloading said counter during burst transfers, wherein said means for periodically reloading reloads said counter after said counter counts said number of cycles.

4. The bus master of claim 1, wherein said memory storing termination data stores termination data for a plurality of target devices coupled to the bus;

wherein said memory comprises a look-up table for each of said plurality of target devices.

5. The bus master of claim 1, wherein said bus master interface is a peripheral component interconnect (PCI) interface adapted for coupling to a PCI bus.

6. A computer system including a bus master that periodically terminates cycles during burst transfers to improve data transfer performance, comprising:

a bus that transmits data;

a target device coupled to the bus, wherein the target device attempts to terminate cycles on the bus during burst transfers;

a bus master coupled to the bus that performs burst transfers to the target device on the bus, wherein the bus master determines termination characteristics of the target device, said termination characteristics of the target device including a number indicative of how many cycles may be performed before the target device attempts to terminate a burst transfer, and wherein the bus master periodically terminates cycles on the bus during a burst transfer based on said determined termination characteristics, wherein said terminated cycles preempt target termination cycles;

wherein said bus master performs a plurality of transfers at initialization to the target device, wherein said plurality of transfers have different lengths, and wherein said plurality of transfers performed at initialization determine said termination data of the target device.

7. The computer system of claim 6, wherein said termination characteristics include a number of cycles that are performed before said target device attempts to terminate a burst transfer, wherein, during a burst transfer to said target device, said bus master periodically terminates cycles on the bus after said number of cycles.

8. The computer system of claim 6, wherein said termination characteristics include an address boundary on which said target device attempts to terminate a burst transfer, wherein, during a burst transfer to said target device, said bus master periodically terminates cycles on the bus after a number of cycles corresponding to said address boundary.

9. The computer system of claim 6, wherein said bus master comprises:

a bus interface adapted for coupling to the bus;

memory for storing termination data for the target device, wherein said termination data for the target device includes a number of cycles that are performed before the target device terminates the cycle;

a direct memory access engine for performing burst transfers to the target device on the bus, wherein the direct memory access engine is coupled to the memory and accesses said termination data from said memory during burst transfers to the target device;

wherein during a burst transfer to the target device the direct memory access engine periodically terminates the burst transfer after said number of cycles.

10. The computer system of claim 9, wherein said bus master further includes:

a counter coupled to said memory for storing said number of cycles;

wherein said counter begins counting during said burst transfer to the target device; and wherein the direct memory access engine terminates the burst transfer when said counter counts said number of cycles.

11. The computer system of claim 9, wherein said memory storing termination data stores termination data for a plurality of target devices coupled to the bus;

wherein said memory comprises a look-up table for each of said plurality of target devices.

12. The computer system of claim 6, wherein said bus is a peripheral component interconnect (PCI) bus.

13. A method of performing transfers on a bus in a computer system, the computer system comprising the bus, a bus master coupled to the bus that performs burst transfers to a target device on the bus, and a target device coupled to the bus that receives data from the burst transfers performed by the bus master, and wherein the bus master predicts termination characteristics of the target and preempts target termination cycles for improved performance, the method comprising:

the bus master performing one or more burst transfers to the target device at one or more address boundaries;

responsive to said step of performing one or more burst transfers to the target device, the bus master determining target termination information of the target device, wherein the target termination information includes a number indicative of how many cycles may be performed before the at least one target device attempts to terminate a burst transfer;

the bus master storing said target termination information after said step of determining; and the bus master performing a burst transfer to the target device, wherein said step of performing said burst transfer comprises:

the bus master configuring itself to terminate at said number of cycles;

the bus master performing at least a portion of the burst transfer after said step of configuring;

the bus master terminating the burst transfer after said number of cycles, wherein said step of terminating is performed after said step of performing at least a portion of said burst transfer; and the bus master repeating said steps of configuring, performing at least a portion of the burst transfer, and terminating the burst transfer, for a duration of said burst transfer;

wherein said steps of the bus master performing one or more burst transfers to the target device, the bus master determining target termination information, and the bus master storing said target termination information are performed during initialization of said bus master.

14. The method of claim 13, wherein said target termination information comprises an address boundary on which said target device terminates a burst transfer;

wherein said step of configuring comprises the bus master configuring itself to terminate at said address boundary on which said target device terminates said burst transfer.

15. The method of claim 13, wherein said bus master further includes a counter, the method further comprising:

said counter beginning counting during said step of the bus master performing at least a portion of said burst transfer; and wherein said step of the bus master terminating the burst transfer is performed in response to said step of counting.

16. The method of claim 15, further comprising:

loading a value in said counter corresponding to said number of cycles; and said counter counting down during said step of the bus master beginning said burst transfer, wherein said counter counts down for each cycle;

wherein said step of the bus master terminating the burst transfer is performed in response to said counter counting down said number of cycles.

17. The method of claim 13, wherein said step of the bus master performing one or more burst transfers to the target device at one or more address boundaries comprises the bus master performing a plurality of burst transfers at a plurality of different address boundaries to obtain said target termination information.

18. The method of claim 13, wherein said bus master further includes a direct memory access engine for performing burst transfers to the target device on the bus;

wherein said step of the bus master device performing one or more burst transfers to the target device at one or more address boundaries comprises:

programming the direct memory access engine with said one or more address boundaries; and the direct memory access engine performing said one or more burst transfers.

19. The method of claim 13, further comprising:

performing said steps of performing one or more burst transfers to the target device at one or more address boundaries, determining target termination information, and storing said target termination information for a plurality of target devices; and maintaining termination information in a memory for each of said plurality of target devices.

20. The method of claim 19, further comprising:

maintaining a look-up table of target information for each of said plurality of target devices.

* * * * *